Oct. 27, 1931. G. H. WHITTINGHAM Re. 18,238

FRICTION SWITCH MECHANISM

Original Filed April 25, 1930 2 Sheets-Sheet 1

Inventor
G. H. Whittingham

By
Robert Watson
Attorney

Oct. 27, 1931. G. H. WHITTINGHAM Re. 18,238

FRICTION SWITCH MECHANISM

Original Filed April 25, 1930 2 Sheets-Sheet 2

Inventor
G. H. Whittingham

By Robert Watson
Attorney

Reissued Oct. 27, 1931 Re. 18,238

UNITED STATES PATENT OFFICE

GEORGE H. WHITTINGHAM, OF BALTIMORE, MARYLAND, ASSIGNOR TO MONITOR CONTROLLER COMPANY, OF BALTIMORE, MARYLAND, A CORPORATION OF MARYLAND

FRICTION SWITCH MECHANISM

Original No. 1,806,377, dated May 19, 1931, Serial No. 447,317, filed April 25, 1930. Application for reissue filed July 14, 1931. Serial No. 550,806.

This invention relates to circuit-controlling mechanism designed to control circuits in predetermined times and in predetermined order after the performance of an initial operation which starts the mechanism into operation. In the control of electric motors, where it is desired to operate relays or contactors in predetermined times and order, delay in the actuation of the switches controlling the contactors or relays may be obtained in various ways, as by the use of thermostats, but practical difficulties arise in the use of such devices where long periods of delay are required in the actuation of the switches. The purpose of the present invention is to provide a circuit-controlling mechanism in which a plurality of switches may be actuated in any desired order and reset simultaneously, and in which a very long delay in actuating the switches is readily obtained.

In carrying out the invention, I provide a shaft which is rotated at a very slow and constant speed; a series of switch members mounted upon a stationary support beside the shaft, a plurality of movable circuit-controlling members loosely journaled on the shaft and having parts adapted to engage the stationary members, these circuit-controlling members being biased away from the stationary members and adapted to rock freely on the shaft into engagement with a fixed stop; friction devices of conducting material rotatable with the shaft and arranged on opposite sides of the movable members, and means for clamping said devices against the movable members to cause the latter to move with the shaft in the direction to engage the stationary switch members. Each circuit-controlling member has an arm which is adjustable toward and from the opposing stationary switch member, to vary the order in which the several switches will be actuated and the time of actuation. The shaft rotates very slowly and at a known speed, so that by adjusting the arm on the movable member the time of its engagement with the stationary member may be accurately pre-set. As each circuit-controlling member engages a stationary member the former member stops, while the friction devices which engage it continue in operation. When it is desired to reset the circuit-controlling members, the friction devices are released from the circuit-controlling members and the latter then rock on the shaft to their initial positions against a fixed stop.

In the accompanying drawings.

Figure 3:
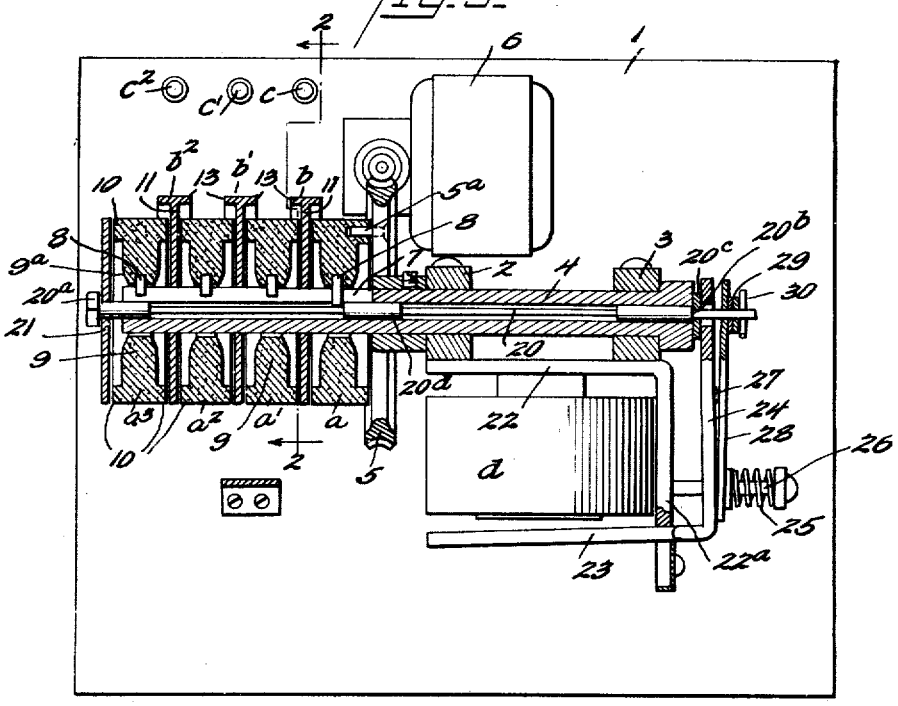
Fig. 3 is a front elevation of the apparatus, the shaft which operates the switches and the mechanism thereon being shown in vertical section.
Figure 4:
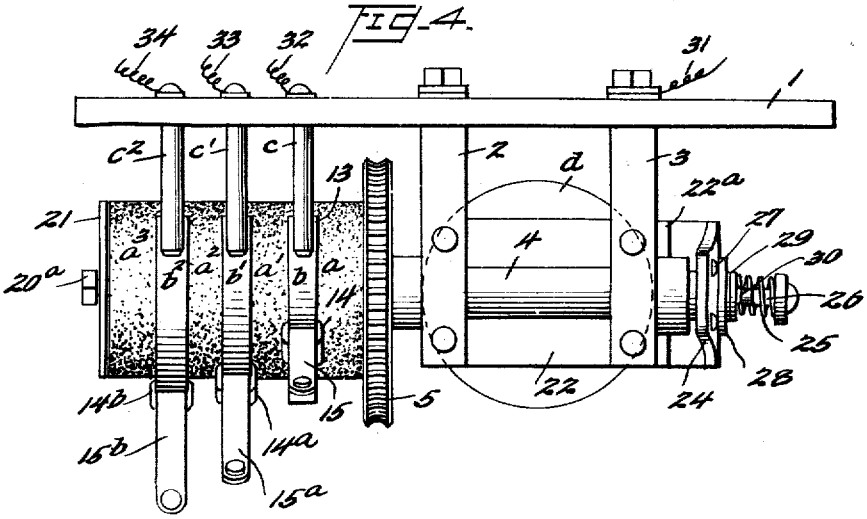
Fig. 4 is a top plan view of the apparatus with the motor removed.

Referring to the drawings, 1 indicates a suitable base of insulating material to which are secured forwardly projecting metal bars 2 and 3, spaced apart from one another and forming supports for the working parts of the apparatus. A tubular shaft 4 extends horizontally through these bars and is journaled therein, and upon this shaft is mounted a worm wheel 5, which is geared to a small electric motor 6 by reduction gearing which causes the worm wheel and shaft 4 to turn at a very low speed when the motor is in operation. The motor is preferably a shunt-wound motor which operates at constant speed. A number of friction disks $a$, $a'$, $a^2$ and $a^3$ are mounted upon the shaft 4, so as to turn with it, but these disks are movable relatively to one another longitudinally of the shaft. The friction disks are composed of electrically conductive material, preferably carbon-graphite composition, molded into the desired shape. The shaft is provided with a longitudinal slot 7, which serves as a keyway into which keys 8, in the friction disks, extend. The key 8, in the disk $a$, extends completely through the slot and projects slightly into the bore of the shaft, while the keys on the other disks are shorter and do not extend into the bore. The webs 9 of the friction disks are formed with central openings sufficiently large in diameter to permit the disks to move freely longitudinally of the shaft and to rock laterally to a slight extent, and to facilitate this latter movement the webs are beveled inwardly toward the openings, as indicated at $9^a$. Each friction disk has oppositely projecting annular flanges 10. One side of the disk $a$ rests against the side of the gear 5, and a pin $5^a$ preferably extends from the gear into a socket in the disk near its periphery, as shown in Fig. 3, to assist in driving the disk.

Between the friction disks are mounted circuit-controlling members $b$, $b'$ and $b^2$, each comprising a metal plate 11, having a central opening 12, through which the tubular shaft extends. The plates are in the form of disks which, for about one-half of their circumferential lengths, project radially beyond the peripheries of the friction disks, and the projecting portion of each plate has a flange 13 which projects at opposite sides of the plate. This flange, on each plate, forms a support and guide for an adjustable contact arm. A U-shaped clamp or yoke 14 fits around the flange of the member $b$ and a contact arm 15 has a short right-angled portion $x$, which is clamped against the periphery of the flange by a set screw 16 at the center of the clamp or yoke. The contact arm 15 extends in an approximately radial direction from the flange and is adapted to engage a stationary contact member $c$, which is mounted upon the switchboard. Similarly, contact arms $15^a$ and $15^b$ are adjustably secured to the flanges of the members $b'$ and $b^2$ by clamps $14^a$ and $14^b$, respectively and these members $15^a$ and $15^b$ are adapted to engage stationary contacts $c'$ and $c^2$, respectively. A weight 17 projects radially from the member $b$ at one end of its flange, and similarly arranged weights $17^a$ and $17^b$ project from the members $b'$ and $b^2$. These weights tend to rock the plates to which they are attached so as to hold the contact arms out of engagement with the stationary contact members, and normally these weights rest against a strip of insulating material 18 which is supported by a bracket 19 connected to the insulating base 1. The edge of the strip 18, which the weights rest against, is parallel with the axis of the shaft 4.

Figure 1:
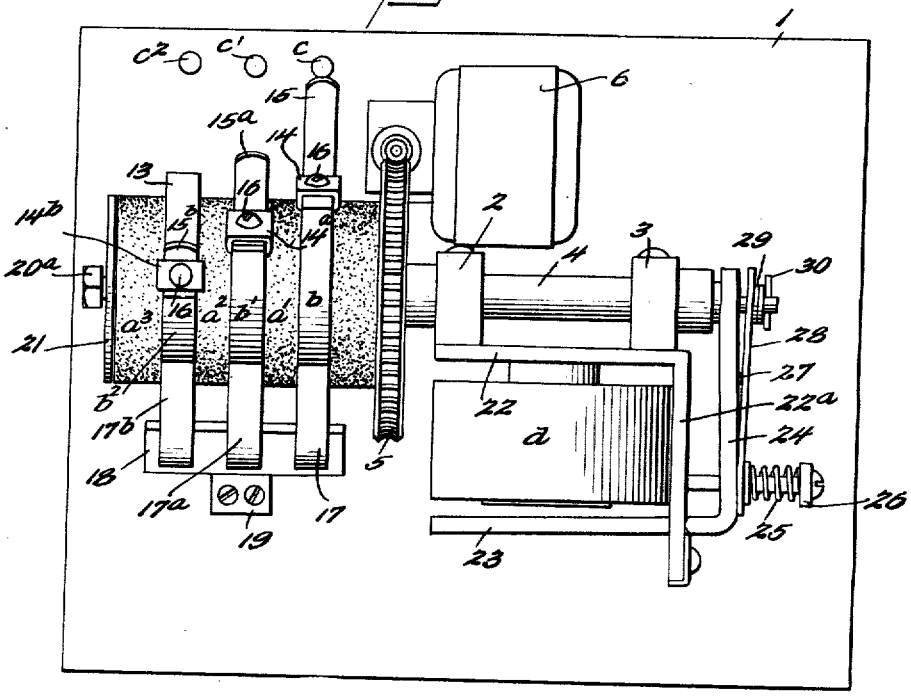
Fig. 1 is a front elevation of the mechanism.

A rod 20 extends longitudinally through the shaft 4 and is provided with a head $20^a$ at one end, and between said head and the friction disk $a^3$ is a metal clamping disk 21 of the same diameter as the disk $a^3$. The rod 20 fits freely in the bore of the shaft 4 and is movable longitudinally therein so that if the rod 20 is moved to the right in Fig. 1, it will cause the clamping disk 21 to bear against the friction disks $a^3$ and the several friction disks will be clamped against the plates of the movable circuit-controlling members $b$, $b'$ and $b^2$. A magnet $d$ is suspended beneath the supporting bars 2 and 3 by an iron plate 22, which is secured to said bars, and has a downwardly turned part $22^a$ in which an armature 23 is pivotally mounted. This armature has an arm 24 which projects upwardly and has an opening through which the right hand end portion of the shaft 20 extends. The shaft 20 has a shoulder $20^b$ and when the magnet is de-energized and its armature is away from its pole-piece, the arm 24 presses the washer against the shoulder and holds the rod in position to release the friction disks, as shown in Figs. 1 and 3. The armature is normally held in this position by a spring 25 which is coiled upon a stud 26, the latter projecting horizontally from the arm $22^a$ on the support 22 through an opening in the arm 24. The arm 24 constitutes a lever for moving the shaft 20. On this lever, midway between the shaft 20 and the spring 25, a projection 27 is provided and this forms a fulcrum for another lever 28, the lower end of which is interposed between the spring 25 and the lever 24. The upper end of the lever 28 has an opening through which the shaft 20 extends and this end of the lever bears against a washer 29 which is held in place by a cotter pin 30, passing through the shaft 30.

When the armature 23 is lifted by the magnet, the lever 24 swings away from the shoulder $20^b$, and pressure is applied to the central part of the lever 28 at the fulcrum 27. As the spring 25 bears against the lower end of the lever 28, the upper end of said lever applies a yielding pressure to the rod 20, tending to force it to the right to clamp the friction disks against the plates of the movable circuit-controlling members. When the armature 23 drops, the lever 24 swings to the left, releasing the pressure at the center of the lever 28, and the lever 24, bearing against the shoulder 21, moves the rod 20 to the left, releasing the pressure of the friction disks against the plates of the movable circuit-controlling members.

In order to avoid any adhesion of the friction disks to the plates when the rod is moved to unclamp the disks, I provide a collar $20^b$ on the rod 20 which strikes the long tooth or key 8 in the friction disk $a$, when the rod 20 is moved to the left by the lever 24, and the jar given to the disk $a$ is imparted to the other disks and the plates, insuring their immediate separation.

A conductor 31 is shown connected to the supporting bar 3 and all of the movable parts of the apparatus are electrically connected to this support and wire 31. Conductors 32, 33 and 34 are shown connected to the stationary switch members $c$, $c'$ and $c^2$, respectively. The coil of the magnet may be connected to the current source in any desired way, according to the use which is to be made of the apparatus.

Figure 2:
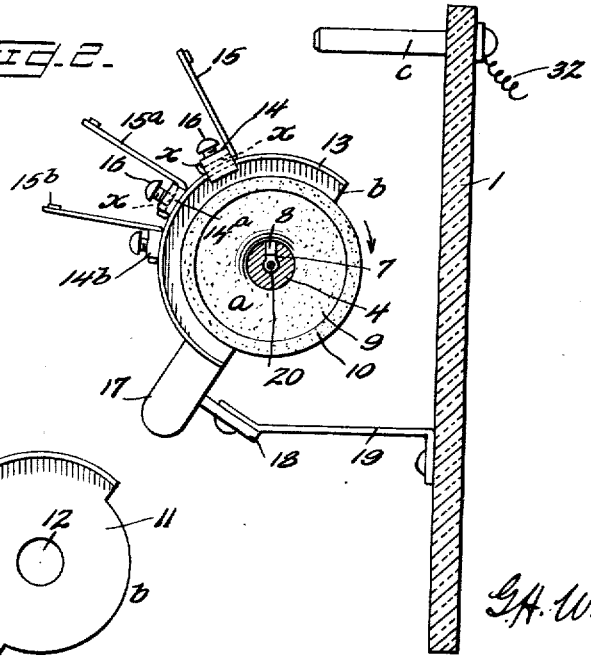
Fig. 2 is a section on the line 2—2 of Fig. 3.
Figure 5:
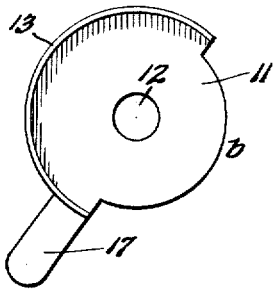
Fig. 5 is a side elevation of one of the movable switch members, its contact arm being removed.

The shaft 4 turns in the clockwise direction when viewed from its right hand end, while the weights on the movable circuit-controlling members tend to rock said members on the shaft away from the stationary switch members. Normally, the movable members are held out of engagement with the stationary members by the weights on the former, which rest against the stop 18. The motor may run constantly, or it may be switched into and out of circuit, as desired, according to the purpose for which the apparatus is used. The arms 15, $15^a$ and $15^b$ will be set on the movable members at any desired distance from the stationary members according to the delay desired in actuating the switches. Assuming the motor to be running and the arms to be set on the movable members as shown in Figs. 1 and 2, if the magnet $d$ is energized, it will attract its armature 23 and the lever 24, connected to the armature, will press the lever 28 to the right and this latter lever will move the rod 20 in the direction to draw the metal disk 21 against the adjacent friction disk $a^3$ and cause the movable members $b$, $b'$ and $b^2$ to be clamped between the friction disks $a$, $a'$, $a^2$ and $a^3$. As the friction disks slowly rotate, the arms 15, $15^a$ and $15^b$ will engage the stationary switch members $c$, $c'$ and $c^2$, respectively, in succession. As each arm engages a stationary switch member the metal plate to which the arm is connected stops while the friction disks on either side of the plate continue to rotate. When it is desired to reset the switches the circuit of the magnet $d$ is broken and the armature of the magnet drops, causing the lever 24 to be moved by the spring against the shoulder $20^b$ on the rod 20, and the rod is thereby moved to the left. When the rod 20 is moved to the left, the pressure of the clamping disk 21 against the friction disk $a^3$ is relieved and the collar or tappet $20^d$ jars the disks and plates loose. When this occurs, the weights on the movable circuit-controlling members immediately rock said members about the shaft until the weights on said members engage the stop 18. The contact arms on said members are thus returned to their original pre-set positions.

As the friction disks, of carbon-graphite composition, are electrically conductive and mounted upon a metal shaft which is connected through its bearings to the current source, good electrical contact is made through the friction disks to the circuit-controlling members when they are clamped between the friction disks. Friction disks of impregnated wood might be substituted for the carbon-graphite disks, but in that event it would be necessary to provide flexible electrical connections to the circuit-controlling members if the latter are to serve as switch members.

What I claim is:

1. In an electric slip-switch mechanism, a shaft, means for rotating the shaft, a stationary switch-member, a movable circuit-controlling member comprising a metal body journaled upon the shaft and having a part adapted to engage said stationary member, said movable member being biased away from said stationary member, friction devices on opposite sides of said body, said devices secured to the shaft so as to rotate therewith and being relatively movable longitudinally of the shaft, and means for clamping said devices frictionally against said body to cause rotation of the movable member into engagement with the stationary member.

2. In an electric slip-switch mechanism, a shaft, means for rotating the shaft, a stationary switch-member, a movable circuit-controlling member comprising a metal body journaled upon the shaft and having a part adapted to engage said stationary member, said movable member being biased away from said stationary member, friction devices of carbon-graphite composition on opposite sides of said body, said devices secured to the shaft so as to rotate therewith and being relatively movable longitudinally of the shaft, and means for clamping said devices frictionally against said body to cause rotation of the movable member into engagement with the stationary member.

3. In an electric slip-switch mechanism, a shaft, means for rotating the shaft, a plurality of stationary switch members, a plurality of movable circuit-controlling members each comprising a metal body journaled upon the shaft and having a part adapted to engage one of said stationary members, said movable members being biased away from said stationary members, friction devices on opposite sides of the several bodies, said devices secured to the shaft so as to rotate therewith and being relatively movable longitudinally of the shaft, and means for clamping said devices frictionally against said bodies to cause rotation of the movable members into engagement with the stationary members.

4. In an electric slip-switch mechanism, a shaft, means for rotating the shaft, a plurality of stationary switch members, a plurality of movable circuit-controlling members each comprising a metal body journaled upon each shaft and having a part adapted to engage one of said stationary members, said movable members being biased away from said stationary members, friction devices of carbon-graphite composition on opposite sides of the several bodies, said devices secured to the shaft so as to rotate therewith and being relatively movable longitudinally of the shaft, and means for clamping said devices frictionally against said bodies to cause rotation of the movable members into engagement with the stationary members.

5. In an electric slip-switch mechanism, a shaft, means for rotating the shaft, a plurality of stationary switch members, a plurality of movable circuit-controlling members each comprising a plate loosely journaled upon the shaft and having a part adapted to engage one of said stationary members, said movable members being biased away from said stationary members, a stop for limiting the free rotation of the several plates, friction devices on opposite sides of the several plates, said devices secured to the shaft so as to rotate therewith and being relatively movable longitudinally of the shaft, and means for clamping said devices frictionally against the plates to cause rotation of the movable members into engagement with the stationary members.

6. In an electric slip-switch mechanism, a shaft, means for rotating the shaft, a stationary switch member, a movable circuit-controlling member comprising a metal disk loosely journaled upon the shaft and an arm adjustable on said disk toward and from the stationary switch member, said movable member being biased away from the stationary member, friction devices on opposite sides of the metal disk, said friction devices secured to the shaft so as to rotate therewith and being relatively movable longitudinally of the shaft, and means for clamping said friction devices against the metal disk to cause rotation of the movable member into engagement with the stationary member.

7. In an electric slip-switch mechanism, a shaft, means for rotating the shaft, a stationary switch member, a movable circuit-controlling member comprising a metal disk loosely journaled upon the shaft and having a peripheral flange and a part adjustably mounted on said flange, a stop for limiting the free rotation of said metal disk, friction devices of carbon-graphite composition on opposite sides of the metal disk, said friction devices secured to the shaft so as to rotate therewith and being relatively movable longitudinally of the shaft, and means for clamping said friction devices against the metal disk to cause rotation of the movable member into engagement with the stationary member.

8. In an electric slip-switch mechanism, a shaft, means for rotating the shaft, a stationary switch member, a movable circuit-controlling member comprising a metal disk loosely journaled upon the shaft and having a part adapted to engage the stationary member and a weighted arm, said arm tending to rock the movable member away from the stationary member, a stop adapted to be engaged by said arm to limit the free rotation of the metal disk, friction devices of carbon-graphite composition on opposite sides of the metal disk, said friction devices secured to the shaft so as to rotate therewith and being relatively movable longitudinally of the shaft, and means for clamping said friction devices against the metal disk to cause rotation of the movable member into engagement with the stationary member.

9. In an electric slip-switch mechanism, a tubular shaft, means for rotating the shaft, a stationary switch member, a movable circuit-controlling member comprising a metal plate loosely journaled upon the shaft and having a part adapted to engage said stationary member, said movable member being biased away from said stationary member, a stop for limiting the free rotation of the plate, friction devices of carbon-graphite composition on opposite sides of the plate, said devices secured to the shaft so as to rotate therewith and being relatively movable longitudinally of the shaft, and means for clamping said friction devices against the plate comprising a rod extending through the bore of said shaft, a clamping disk mounted on said rod and adapted to engage one of the friction devices, an electromagnet, and means operated by the magnet for moving said rod endwise to cause the clamping disk to press the friction devices against the metal plate.

10. In an electric slip-switch mechanism, a shaft, means for rotating the shaft, a stationary switch-member, a movable circuit controlling member comprising a metal body journaled upon the shaft and having a part adapted to engage said stationary member, said movable member being biased away from said stationary member, friction devices on opposite sides of said body, said devices secured to the shaft so as to rotate therewith and being relatively movable longitudinally of the shaft, means for clamping said devices against the plate and for releasing the devices, and means for jarring said devices and metal body when they have been released.

11. In an electric slip-switch mechanism, a tubular shaft, means for rotating the shaft, a stationary switch-member, a movable circuit-controlling member comprising a metal body journaled upon the shaft and having a part adapted to engage said stationary member, said movable member being biased away from said stationary member, friction devices on opposite sides of said body, said devices secured to the shaft so as to rotate therewith and being relatively movable longitudinally of the shaft, a rod extending through the bore of the shaft, a clamping disk on the rod adapted to engage one of the friction devices, means for moving said rod to clamp and unclamp said devices, and means on the rod for jarring said devices when the rod is moved to unclamp the disks.

12. An electric slip-switch mechanism comprising a shaft, means for rotating the shaft, a stationary switch member, a movable circuit-controlling member journaled upon the shaft and biased away from said stationary member, friction devices carried by the shaft on opposite sides of the movable member and positively driven by the shaft, a stop for limiting the movement of the latter member away from the stationary member and means for clamping said devices against the movable member and for releasing said devices.

13. An electric slip-switch mechanism comprising a shaft, means for rotating the shaft, a stationary switch member, a movable circuit-controlling member journaled upon the shaft and biased away from said stationary member, a part adjustable on the movable member toward and from the stationary member, friction devices carried by the shaft on opposite sides of the movable member and positively driven by the shaft, a stop for limiting the movement of the latter member away from the stationary member, and means for clamping said devices against the movable member and for releasing said devices.

14. An electric slip-switch mechanism comprising a shaft, means for rotating the shaft, a plurality of stationary switch members, a plurality of movable circuit-controlling members journaled on the shaft and biased away from the stationary members, friction devices carried by the shaft on opposite sides of the several movable members and positively driven by the shaft, and means for clamping said devices against the movable members and for releasing said devices.

In testimony whereof I affix my signature.

GEORGE H. WHITTINGHAM.

CERTIFICATE OF CORRECTION.

Reissue Patent No. 18,238. Granted October 27, 1931, to

GEORGE H. WHITTINGHAM.

It is hereby certified that error appears in the printed specification of the above numbered patent requiring correction as follows: Page 3, line 120, claim 4, for the word "each" read the; and that the said Letters Patent should be read with this correction therein that the same may conform to the record of the case in the Patent Office.

Signed and sealed this 9th day of February, A. D. 1932.

(Seal)

M. J. Moore,
Acting Commissioner of Patents.